(12) United States Patent
Erbizzoni et al.

(10) Patent No.: US 11,535,061 B2
(45) Date of Patent: Dec. 27, 2022

(54) BICYCLE TYRE

(71) Applicant: Pirelli Tyre S.p.A., Milan (IT)

(72) Inventors: Laura Erbizzoni, Milan (IT); Paolo Brivio, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 213 days.

(21) Appl. No.: 16/633,654

(22) PCT Filed: Jul. 31, 2018

(86) PCT No.: PCT/IB2018/055703
§ 371 (c)(1),
(2) Date: Jan. 24, 2020

(87) PCT Pub. No.: WO2019/025953
PCT Pub. Date: Feb. 7, 2019

(65) Prior Publication Data
US 2020/0207151 A1 Jul. 2, 2020

(30) Foreign Application Priority Data

Jul. 31, 2017 (IT) .................. 102017000087536

(51) Int. Cl.
*B60C 11/00* (2006.01)
*B60C 9/06* (2006.01)

(52) U.S. Cl.
CPC ............ *B60C 11/0083* (2013.01); *B60C 9/06* (2013.01); *B60C 2200/12* (2013.01)

(58) Field of Classification Search
CPC ............ B60C 11/0083; B60C 2200/12; B60C 2200/14; B60C 2200/10; B60C 3/04
See application file for complete search history.

(56) References Cited

U.S. PATENT DOCUMENTS 5,088,535 A * 2/1992 Potts .................... B60C 11/032
152/209.11
6,250,352 B1 6/2001 Ishikawa
(Continued)

FOREIGN PATENT DOCUMENTS

CN 1222458 A 7/1999
CN 101790465 A 7/2010
(Continued)

OTHER PUBLICATIONS

International Search Report form the European Patent Office in corresponding International Application No. PCT/IB2018/055703 dated Nov. 7, 2018.
(Continued)

*Primary Examiner* — Cedrick S Williams
(74) *Attorney, Agent, or Firm* — Finnegan, Henderson, Farabow, Garrett & Dunner, L.L.P.

(57) ABSTRACT

A bicycle tyre (100), comprising a carcass structure (2) and a tread band (7) applied in a radially outer position with respect to the carcass structure (2). The tread band (7) comprises a crown portion (7*a*) extending astride of an equatorial plane (X) of the tyre (100) and having a predetermined radius of curvature (R1) and a pair of lateral portions (7*b*) arranged on axially opposite sides with respect to the crown portion (7*a*) and each having a second radius of curvature (R2) greater than said first radius of curvature (R1).

15 Claims, 5 Drawing Sheets

(56) References Cited

U.S. PATENT DOCUMENTS

| | | | |
|---|---|---|---|
| 6,568,446 B1 * | 5/2003 | Schulte | B29D 30/38 152/555 |
| 2007/0039673 A1 | 2/2007 | Bolden | |
| 2007/0056671 A1 | 3/2007 | Klapp | |
| 2011/0168315 A1 | 7/2011 | Potin | |
| 2014/0069562 A1 | 3/2014 | Felt | |
| 2016/0207269 A1 * | 7/2016 | Colby | B29D 30/56 |
| 2016/0236528 A1 | 8/2016 | Sunahiro | |
| 2016/0257171 A1 | 9/2016 | Ichiryu | |
| 2018/0304690 A1 | 10/2018 | Misani et al. | |

FOREIGN PATENT DOCUMENTS

| | | | | |
|---|---|---|---|---|
| CN | 101873939 A | 10/2010 | | |
| CN | 102046396 A | 5/2011 | | |
| CN | 102085775 A | 6/2011 | | |
| CN | 102259562 A | 11/2011 | | |
| CN | 102463855 A | 5/2012 | | |
| CN | 105984285 A | 10/2016 | | |
| CN | 106414107 A | 2/2017 | | |
| DE | 102004023970 | 12/2005 | | |
| EP | 0182365 | 5/1986 | | |
| EP | 0502694 A1 | 9/1992 | | |
| EP | 653317 A1 * | 5/1995 | | B60C 11/18 |
| EP | 0668174 A1 | 8/1995 | | |
| EP | 2982522 A2 | 2/2016 | | |
| EP | 3061625 A1 | 8/2016 | | |
| JP | H 2151502 | 6/1990 | | |
| JP | H 6-297912 A | 10/1994 | | |
| JP | H 9-71107 A | 3/1997 | | |
| JP | H 10193918 | 7/1998 | | |
| JP | 2000-255208 A | 9/2000 | | |
| JP | 2001-55010 A | 2/2001 | | |
| JP | 2001-98315 | 4/2001 | | |
| JP | 3231006 | 9/2001 | | |
| JP | 2007-326520 A | 12/2007 | | |
| JP | 2012-148680 A | 8/2012 | | |
| TW | 200408564 A | 6/2004 | | |
| WO | WO 0205143 A1 | 1/2002 | | |
| WO | WO 2011/012944 A1 | 2/2011 | | |
| WO | WO 2017072708 A1 | 5/2017 | | |

OTHER PUBLICATIONS

Written Opinion of the International Searching Authority from the European Patent Office in corresponding International Application No. PCT/IB2018/055703 dated Nov. 7, 2018.

Notification of First Office Action dated Aug. 30, 2021, from China National Intellectual Property Administration, in counterpart Chinese Application No. 201880056989.4.

Notification of Second Office Action dated Dec. 6, 2021, from China National Intellectual Property Administration, in counterpart Chinese Application No. 201880056989.4.

Office Action in counterpart Brazilian Application No. BR112020001570 dated Jul. 5, 2022 (6 pages, translation included).

* cited by examiner

BICYCLE TYRE

This application is a national stage entry application under 35 U.S.C. § 371 based on International Application No. PCT/IB2018/055703, filed Jul. 31, 2018, and claims priority to Italian Patent Application No. 102017000087536, filed Jul. 31, 2017; the content of each application is incorporated herein by reference.

The present invention relates to a bicycle tyre.

Preferably, bicycles equipped with the tyre of the invention are assisted-pedaling bicycles, also commonly called "electric bicycles" or "e-bikes", in particular electric road bicycles.

In the present description and in the following claims, the following definitions apply.

The term "assisted-pedaling bicycles" is used to refer to bicycles provided with an auxiliary electric motor capable of developing a continuous maximum nominal power of 0.25 KW.

The term "electric road bicycles" is used to refer to assisted-pedaling bicycles provided mainly for recreational use in urban or semi-urban areas and for a ground that is compact and kept substantially regular, like for example asphalt, or for not completely asphalted road surfaces, like for example cycling tracks left as a dirt road and/or covered with fine gravel. Such bicycles include for example the so-called urban bikes, city bikes and commuting bike.

The term "equatorial plane" of the tyre indicates a plane perpendicular to the rotation axis of the tyre and that divides the tyre into two symmetrically equal parts.

The terms "radial" and "axial" and the expressions "radially inner/outer" and "axially inner/outer" are used with reference to a direction perpendicular to and a direction parallel to the rotation axis of the tyre, respectively.

The expressions "axially innermost" and "axially outermost" indicate a position closer to, and farther from, the equatorial plane, respectively.

The terms "circumferential" and "circumferentially" are used with reference to the direction of the annular development of the tyre, i.e. to the rolling direction of the tyre, which corresponds to a direction lying on a plane coinciding with or parallel to the equatorial plane of the tyre.

The term "elastomeric material" is used to indicate a composition comprising at least one elastomeric polymer and at least one reinforcing filler. Preferably, such a composition also comprises additives like, for example, a cross linking agent and/or a plasticizer. Thanks to the provision of the cross linking agent, such a material can be cross-linked by heating.

The term "cord", or the expression "reinforcing cord" is used to indicate an element consisting of one or more thread-like elements (hereinafter also called "wires") possibly coated with, or incorporated in, a matrix of elastomeric material.

The term "diameter" of a cord or of a wire indicates the thickness of the cord or of the wire measured as prescribed by the method BISFA E10 (The International Bureau For The Standardization Of Man-Made Fibres, Internationally Agreed Methods For Testing Steel Tyre Cords, 1995 edition).

The term "thread count" of a layer or of a ply or of a fabric indicates the number of reinforcing cords per unit length provided in such a layer/ply/fabric. The thread count can be measured in TPI (threads per inch).

The term "linear density" or "count" of a cord or of a wire indicates the weight of the reinforcing cord per unit of length. The linear density can be measured in dtex (grams per 10 km of length).

The term "bicycle tyre" is used to indicate a tyre that has a fitting diameter not lower than about 500 mm (which corresponds to an outer diameter of about 24 inches), preferably lower than, or equal to, about 650 mm (which can correspond to a particular outer diameter of about 28, 29 or 30 inches depending on the width of the tyre), and a width not greater than about 70 mm, preferably greater than about 35 mm.

The term "fitting diameter" of a tyre indicates the diameter of the tyre measured at the inner diameter of the bead cores provided for anchoring the tyre to the rim of the wheel, as prescribed in ETRTO (The European Tyre and Rim Technical Organization) or ISO (International Organization for Standardization).

The term "width" of a tyre indicates the maximum axial extension (or "maximum cord") of the tyre, measured according to the ETRTO standard. The width of the tyre corresponds to the width of the projection of the tyre on a plane perpendicular to the equatorial plane of the tyre and tangent to the maximum diameter of the tyre, such a width corresponding to the size of the segment having the two axially outermost points of the tyre as extreme values.

The term "transversal curvature" of the tyre indicates the curvature measured through a radius of curvature of a portion of the profile of a cross section of the tyre.

The term "radius of curvature" of a portion of the profile of a cross section of the tyre indicates the radius of the circumference that best approximates that portion of profile.

Throughout the present description and in the following claims, when reference is made to certain values of certain angles, they are intended as absolute values, i.e. both positive values and negative values with respect to a reference plane.

When reference is made to the profile of the tread, the profile taken up by the tread band when the tyre is inflated is considered.

A bicycle tyre typically comprises a carcass structure turned around a pair of bead cores and a tread band arranged in a radially outer position with respect to the carcass structure.

The carcass structure is configured to withstand the inflation pressure and to support the weight of the bicycle and of the cyclist. It comprises one or more carcass plies, each comprising a plurality of properly oriented reinforcing cords. In the case of many carcass plies, they are inclined with respect to one another to form a crossed structure.

The tread band is configured to ensure that the tyre adheres to the asphalt.

The bead cores have the task of ensuring that the tyre is anchored to the rim of the wheel.

In a radially inner position with respect to the carcass structure an air chamber is typically provided, in which pressurized air is introduced. However, there are types of tyres called "tubeless", i.e. without an air chamber. In such tyres the pressurized air acts directly on the carcass structure. The latter and the rim of the wheel are configured so that their mutual anchoring ensures the airtight seal.

PRIOR ART

JP 3231006A, US 20070039673, US 20070056671, EP 0668174, EP 0182365, EP 2982522, US 2011/0168315, US 2016/0236528 describe examples of bicycle tyres whose tread band has a characteristic arched radially outer profile. Such a profile will be identified hereinafter as "balloon profile".

JP 200198315 describes a tyre for bicycles or motorcycles having a piston displacement lower than 100 cc. Also in this tyre the tread band has a balloon profile.

DE 102004023970 describes a tyre for motorcycles or bicycles (in particular for mountain bikes) whose tread band comprises a crown portion and two opposite shoulder portions each having a radius of curvature smaller than that of the crown portion.

SUMMARY OF THE INVENTION

The Applicant observed that in certain riding conditions (like for example on downhill slopes) the bicycles, and therefore also the electric bicycles, can reach speeds even greater than 25 Km/h, i.e. totally comparable with those reached by motorcycles having a piston displacement lower than 100 cc, in particular equal to 50 cc.

The Applicant also observed that although in many countries the speed limit for electric bicycles in normal riding conditions with the electric motor activated is equal to 25 Km/h (indeed, the electric motor is programmed to deactivate once this speed is reached), in other countries there is no such a legal limit or it is higher and, consequently, it is possible to greatly exceed 25 km/h.

The Applicant observed that at such speeds the tyre of the electric bicycle not only must be capable of supporting the weight of the bicycle (greater than that of a conventional bicycle) and of the cyclist, but it must also offer an adequate response in acceleration and braking, an adequate handling and controllability in straights or in gentle corners (i.e. with small camber angles) and, mostly, a high grip and stability in sharper corners (i.e. with high camber angles), so as to avoid risks of cyclist falling.

The Applicant observed that the aforementioned requirements of performance (response in acceleration and braking, handling and controllability in a straight line or in gentle corners) and safety (grip and stability in sharper corners) are recently even greater due to the fact that electric bicycles designed precisely with the aim of offering high structural strength and high riding performance have been put recently into the market. Such electric bicycles indeed comprise particularly strong frames (thus suitable for supporting heavy loads), profiles suitably designed to ensure handling and riding stability and brakes sized both to express high powers in response to the heavy loads and to the high speed and to ensure constant efficiency (thus avoiding overheating).

The Applicant noted that conventional bicycle tyres having balloon profile are not suitable for satisfying all of the aforementioned requirements. In particular, the balloon profile does not allow the tyre to offer the desired response in terms of grip and stability in sharper corners.

The Applicant observed that in order to achieve such a response it is advisable for the lateral portions of the tread band to have a not excessively curved profile, so as to provide an as wide as possible support/contact with the road surface and transfer over a wider footprint the lateral stresses which the tyre is subjected to during cornering.

The Applicant also observed that in order to obtain the desired handling and controllability in a straight line or in gentler corners it is advisable for the tread band to have, in the crown portion thereof, a sufficiently curved profile, so as to allow the cyclist to easily move the bicycle during travel.

The Applicant has thus thought to make a tread band having, in the crown portion thereof, a curvature suitable for providing the desired handling and controllability of riding in a straight line and in gentle corners and, in the opposite lateral portions, a curvature smaller than that of the aforementioned crown portion, so as to achieve the desired grip and stability in sharper corners.

Therefore, in a first aspect thereof the present invention relates to a bicycle tyre, in particular a tyre for electric bicycles, comprising a carcass structure and a tread band applied in a radially outer position with respect to the carcass structure.

Preferably, the tread band comprises a crown portion extending astride of an equatorial plane of the tyre.

Preferably, said crown portion has a predetermined radius of curvature.

Preferably, the tread band comprises a pair of lateral portions arranged on axially opposite sides with respect to the crown portion.

Preferably, each of said lateral portions has a second radius of curvature greater than said first radius of curvature.

The Applicant believes that the provision of a radius of curvature in the shoulder portions of the tread band wider than that of the crown portion thereof provides the tyre with the desired riding characteristics both in a straight line and in gentler corners (i.e. with low camber angles) and in sharper corners (i.e. with high camber angles). This is obtained thanks to the fact that during travel in a straight line or with small camber angles the tyre rests on the ground at a portion of tread band (the crown portion) that has a curvature specifically selected to provide the tyre with stability and controllability in these travel conditions, whereas during travel with high camber angles the tyre rests on the ground at a portion of tread band (the shoulder portion) that, having a curvature smaller than that of the crown portion (i.e. a greater radius of curvature), produces a larger footprint, to the benefit of the stability and controllability of the tyre in this particular travel condition.

In a second aspect thereof, the invention relates to a bicycle wheel, in particular for electric bicycles, comprising a rim and a tyre in accordance with the aforementioned first aspect of the invention, wherein said tyre is mounted on said rim and is inflated to a predetermined pressure.

Preferably, said predetermined pressure is greater than, or equal to, about 1.5 bar.

Preferably, said predetermined pressure is lower than, or equal to, about 3.5 bar.

In preferred embodiments, said predetermined pressure is comprised between about 1.5 bar and about 3.5 bar, the extreme values being included, for example equal to about 2.3 bar.

In at least one of the aforementioned aspects the present invention can have at least one of the following preferred characteristics, taken singularly or in combination with any of the other preferred characteristics described herein.

Preferably, the tyre has a ratio between radius of curvature in said crown portion and width of the tyre equal to at least 0.3.

Preferably, the tyre has a ratio between radius of curvature in each of the aforementioned lateral portions and width of the tyre equal to at least 0.5, more preferably equal to at least 0.55, even more preferably equal to at least 0.6.

Preferably, the tyre has a ratio between radius of curvature in each of the aforementioned lateral portions and width of the tyre lower than 3, more preferably lower than 2, even more preferably lower than 1.5.

In preferred embodiments, the tyre has a ratio between radius of curvature in each of the aforementioned lateral portions and width of the tyre comprised between about 0.5 and about 3, the extreme values being included, more preferably between about 0.55 and about 2, the extreme values being included, even more preferably between about 0.6 and about 1.5, the extreme values being included, for example equal to about 0.7.

Therefore, the tyre is relatively narrow, and thus has a small footprint. Despite the small footprint the tyre performs very well in terms of stability during extreme maneuvers, like for example in corners with high camber angles along a downhill. This is thanks to the fact that the curvature of the aforementioned lateral portions is smaller than that of the crown portion. Such a smaller curvature indeed makes it possible to support the tyre, during the aforementioned cornering maneuvers, over a greater footprint, with clear advantages in terms of safety for the cyclist.

Preferably, said first radius of curvature is greater than, or equal to, about 20 mm, more preferably greater than, or equal to, about 25 mm.

Preferably, said first radius of curvature is lower than, or equal to, about 35 mm, more preferably lower than, or equal to, about 30 mm.

In preferred embodiments, said first radius of curvature is comprised between about 20 mm and about 35 mm, the extreme values being included, preferably between about 25 mm and about 30 mm, the extreme values being included, for example equal to about 27 mm.

Preferably, said second radius of curvature is greater than, or equal to, about 30 mm, more preferably greater than, or equal to, about 40 mm.

Preferably, said second radius of curvature is lower than, or equal to, about 100 mm, more preferably lower than, or equal to, about 70 mm.

In preferred embodiments, said second radius of curvature is comprised between about 30 mm and about 100 mm, the extreme values being included, preferably between about 35 mm and about 70 mm, the extreme values being included, for example equal to about 40 mm.

Preferably, said crown portion has an angular width greater than, or equal to, about 70°, more preferably greater than, or equal to, about 75°.

Preferably, said crown portion has an angular width lower than, or equal to, about 90°, more preferably lower than, or equal to, about 85°.

In preferred embodiments, said crown portion has an angular width comprised between about 70° and about 90°, the extreme values being included, preferably between about 75° and about 85°, the extreme values being included, for example equal to about 80°.

Preferably, each of said lateral portions has an angular width greater than about 35°, more preferably greater than about 40°.

Preferably, each of said lateral portions has an angular width lower than about 50°, more preferably lower than about 45°.

In preferred embodiments, each of said lateral portions has an angular width comprised between about 35° and about 50°, preferably between about 40° and about 45°, the extreme values being included, for example equal to about 43°.

Preferably, the width of said crown portion is greater than, or equal to, 30% of the width of the tyre, more preferably greater than, or equal to, 40% of the width of the tyre, even more preferably greater than, or equal to, 50% of the width of the tyre.

Preferably, the width of said crown portion is lower than, or equal to, 80% of the width of the tyre, more preferably lower than, or equal to, 70% of the width of the tyre, even more preferably lower than, or equal to, 60% of the width of the tyre.

In preferred embodiments, the width of said crown portion is comprised between about 30% and about 80% of the width of the tyre, the extreme values being included, preferably between about 40% and about 70% of the width of the tyre, the extreme values being included, more preferably between about 45% and about 60% of the width of the tyre, the extreme values being included, for example equal to about 50% of the width of the tyre.

Preferably, the width of each of said lateral portions is greater than, or equal to, 10% of the width of the tyre, more preferably greater than, or equal to, 15% of the width of the tyre, even more preferably greater than, or equal to, 20% of the width of the tyre.

Preferably, the width of each of said lateral portions is lower than, or equal to, 35% of the width of the tyre, more preferably lower than, or equal to, 30% of the width of the tyre, even more preferably lower than, or equal to, 25% of the width of the tyre.

In preferred embodiments, the width of each of said lateral portions is comprised between about 10% and about 35% of the width of the tyre, the extreme values being included, preferably between about 15% and about 30% of the width of the tyre, the extreme values being included, more preferably between about 20% and about 25% of the width of the tyre, the extreme values being included, for example equal to about 25% of the width of the tyre.

In some embodiments, said tread band comprises a pair of shoulder portions arranged on axially opposite sides with respect to the crown portion and in an axially outermost position with respect to said lateral portions.

Preferably, each of said shoulder portions has a third radius of curvature different from said second radius of curvature, more preferably smaller than said second radius of curvature.

According to the Applicant, the provision of opposite shoulder portions having a curvature greater than that of the opposite lateral portions provides the tyre with a greater controllability in sharper corners. Indeed, when the leaning tyre rests on the ground at the aforementioned shoulder portions the cyclist perceives that the stable support condition that occurs when the leaning tyre rests on the ground at the aforementioned lateral portions has been passed and understands that, in order to avoid the risk of falling, it is advisable to avoid leaning the bicycle further.

Preferably, said third radius of curvature is different from said first radius of curvature, more preferably greater than said first radius of curvature.

Preferably, said third radius of curvature is greater than, or equal to, about 25 mm, more preferably greater than, or equal to, about 30 mm.

Preferably, said third radius of curvature is lower than, or equal to, about 50 mm, more preferably lower than, or equal to, about 40 mm.

In preferred embodiments, said third radius of curvature is comprised between about 25 mm and about 50 mm, the extreme values being included, preferably between about 30 mm and about 45 mm, the extreme values being included, for example equal to about 40 mm.

Preferably, each of said shoulder portions has an angular width greater than, or equal to about 0°, more preferably greater than, or equal to about 10°.

Preferably, each of said shoulder portions has an angular width lower than, or equal to about 20°, more preferably lower than, or equal to about 15°.

In preferred embodiments, each of said shoulder portions has an angular width comprised between about 0° and about 25°, the extreme values being included, more preferably between about 5° and about 20°, the extreme values being included, for example equal to about 10°.

Preferably, the width of each of said shoulder portions is greater than, or equal to 0% of the width of the tyre, more preferably greater than, or equal to 5% of the width of the tyre.

Preferably, the width of each of said shoulder portions is lower than, or equal to 15% of the width of the tyre, more preferably lower than, or equal to 10% of the width of the tyre.

In preferred embodiments, the width of each of said shoulder portions is comprised between about 0% and about 15% of the width of the tyre, the extreme values being included, preferably between about 5% and about 10% of the width of the tyre, the extreme values being included, for example equal to about 6% of the width of the tyre.

Preferably, said carcass structure comprises at least one carcass ply.

Preferably, said at least one carcass ply is engaged, at each of the axially opposite end edges thereof, to a respective annular anchoring structure.

Preferably, said at least one carcass ply includes a plurality of reinforcing cords.

Preferably, said reinforcing cords are inclined, with respect to said equatorial plane, by a first angle.

Preferably, said first angle is greater than, or equal to, about 30°, more preferably greater than, or equal to, about 40.

Preferably, said first angle is lower than, or equal to, about 60°, more preferably lower than, or equal to, about 50°.

In preferred embodiments, said first angle is comprised between about 30° and about 60°, the extreme values being included, more preferably between about 40° and about 50°, the extreme values being included, for example equal to about 45°.

In first embodiments, the carcass structure comprises a single carcass ply of the type described above. Hereinafter, a tyre having such a carcass structure is also indicated as "single-ply tyre".

In second embodiments, the carcass structure comprises a first carcass ply including a first plurality of reinforcing cords inclined, with respect to said equatorial plane, by said first angle and a second carcass ply applied in a radially outer position with respect to the first carcass ply.

Preferably, said second carcass ply includes a second plurality of reinforcing cords inclined, with respect to said equatorial plane, by said first angle on the opposite side to said first plurality of reinforcing cords. Hereinafter, a tyre having such a carcass structure is also indicated as "two-ply tyre".

In alternative embodiments, the carcass structure can comprise more than two carcass plies, each carcass ply being arranged so as to define a crossed structure with the adjacent radially inner carcass ply, in a totally identical way to what has been described above with reference to the first and second carcass plies.

In other embodiments, for example intended for tyres to be used on particularly irregular surfaces (paved, dirt roads), further reinforcing plies can also be provided, arranged axially between the beads, preferably radially between the carcass plies.

Preferably, the weight of said tyre is greater than, or equal to, about 0.25 Kg, more preferably greater than, or equal to, about 0.50 Kg, even more preferably greater than, or equal to, about 0.6 Kg.

Preferably, the weight of said tyre is lower than, or equal to, about 1.4 Kg, more preferably lower than, or equal to, about 1.2 Kg, even more preferably lower than, or equal to, about 1 Kg.

In preferred embodiments, the weight of said tyre is comprised between about 0.25 Kg and about 1.4 Kg, the extreme values being included, preferably between about 0.5 Kg and about 1.2 Kg, the extreme values being included, more preferably between about 0.6 Kg and about 1 Kg, for example equal to about 0.9 Kg.

Preferably, the reinforcing cords of said at least one carcass ply are made of a textile material, so as to limit the weight of the tyre as much as possible.

Preferably, the single carcass ply (in the case of a single-ply tyre), or each of the carcass plies (in the case of a tyre with two or more carcass plies), has a thread count greater than, or equal to, about 15 TPI, more preferably greater than, or equal to, about 30 TPI, even more preferably greater than, or equal to, about 60 TPI, even more preferably, greater than, or equal to, about 120 TPI.

Preferably, the single carcass ply (in the case of a single-ply tyre), or each of the carcass plies (in the case of a tyre with two or more carcass plies), has a thread count lower than, or equal to, about 360 TPI, more preferably lower than, or equal to, about 300 TPI, even more preferably lower than, or equal to, about 240 TPI, even more preferably lower than, or equal to, about 200 TPI.

In preferred embodiments, the single carcass ply (in the case of a single-ply tyre), or each of the carcass plies (in the case of a tyre with two or more carcass plies), has a thread count comprised between about 15 TPI and about 360 TPI, the extreme values being included, preferably between about 30 TPI and about 300 TPI, the extreme values being included, more preferably between about 60 TPI and about 240 TPI, the extreme values being included, even more preferably between about 120 TPI and about 200 TPI, the extreme values being included, for example equal to about 60 TPI.

It is preferable, in the case of a two-ply tyre (or a tyre with more than two carcass plies), that the second carcass ply (or at least another carcass ply) has a thread count substantially identical to that of the first carcass ply.

Preferably, the reinforcing cords of the single carcass ply (in the case of a single-ply tyre) or of each carcass ply (in the case of a two-ply tyre or a tyre with more than two carcass plies) have a diameter lower than, or equal to, about 0.55 mm, more preferably lower than, or equal to, about 0.35 mm.

Preferably, the reinforcing cords of the single carcass ply (in the case of a single-ply tyre) or of each carcass ply (in the case of a two-ply tyre or a tyre with more than two carcass plies) have a diameter greater than, or equal to, about 0.10 mm, more preferably greater than, or equal to, about 0.12 mm.

In preferred embodiments, the reinforcing cords of the single carcass ply (in the case of a single-ply tyre) or of each carcass ply (in the case of a two-ply tyre or a tyre with more than two carcass plies) have a diameter comprised between about 0.10 mm and about 0.55 mm, the extreme values being included, preferably between about 0.12 mm and about 0.35 mm, the extreme values being included, for example equal to about 0.30 mm.

Preferably, the reinforcing cords of the single carcass ply (in the case of a single-ply tyre) or of each carcass ply (in the case of a two-ply tyre or a tyre with more than two carcass plies) have a linear density greater than, or equal to, about 110 dtex, more preferably greater than, or equal to, about 230 dtex.

Preferably, the reinforcing cords of the single carcass ply (in the case of a single-ply tyre) or of each carcass ply (in the case of a two-ply tyre or a tyre with more than two carcass plies) have a linear density lower than, or equal to, about 1300 dtex, more preferably lower than, or equal to, about 940 dtex.

In preferred embodiments, the reinforcing cords of the single carcass ply (in the case of a single-ply tyre) or of each carcass ply (in the case of a two-ply tyre or a tyre with more than two carcass plies) have a linear density comprised between about 110 dtex and about 1300 dtex, the extreme values being included, preferably between about 230 dtex and about 940 dtex, the extreme values being included, for example equal to about 450 dtex.

The tyre of the present invention can optionally also contain at least one belt layer associated in a radially outer position with the carcass structure.

Preferably, said at least one belt layer comprises at least one reinforcing cord wound on the carcass structure according to a winding direction oriented, with respect to said equatorial plane, at a second angle greater than, or equal to, about 0°.

Preferably, said at least one belt layer comprises at least one reinforcing cord wound on the carcass structure according to a winding direction oriented, with respect to said equatorial plane, at a second angle lower than, or equal to, about 30°.

Preferably, said at least one belt layer comprises at least one reinforcing cord wound on the carcass structure according to a winding direction oriented, with respect to said equatorial plane, at a second angle comprised between about 0° and about 30°, the extreme values being included.

In a first embodiment, said at least one reinforcing cord of said at least one belt layer is wound in a helix on the carcass structure according to said winding direction.

In an alternative embodiment, said at least one belt layer comprises a plurality of parallel reinforcing cords each of which is wound on the carcass structure according to said winding direction.

Preferably, said second angle is greater than, or equal to, about 0°.

Preferably, said second angle is lower than, or equal to, about 5°.

Preferably, said second angle is comprised between about 0° and about 5°, the extreme values being included.

More preferably, said winding direction is substantially circumferential, i.e. said second angle is substantially equal to about 0°.

Preferably, said at least one belt layer has a width smaller than the width of the tyre.

More preferably, the width of said at least one belt layer is greater than 20% of the width of the tyre, more preferably more than 30% of the width of the tyre, even more preferably more than 40% of the width of the tyre.

More preferably, the width of said at least one belt layer is lower than 80% of the width of the tyre, more preferably lower than 70% of the width of the tyre, even more preferably lower than 65% of the width of the tyre.

In preferred embodiments, the width of said at least one belt layer is comprised between about 20% and about 80% of the width of the tyre, the extreme values being included, preferably between about 30% and about 70% of the width of the tyre, the extreme values being included, more preferably between about 40% and about 65% of the width of the tyre, the extreme values being included, for example equal to about 60% of the width of the tyre.

Preferably, the reinforcing cord(s) of said at least one belt layer is/are made of a textile material.

Preferably, the same type of reinforcing cord is used both in the carcass structure and in said at least one belt layer.

More preferably, the reinforcing cords of the carcass structure and of said at least one belt layer are made of the same textile material.

Preferably, said at least one belt layer has a thread count greater than, or equal to, about 15 TPI, more preferably greater than, or equal to, about 30 TPI.

Preferably, said at least one belt layer has a thread count lower than, or equal to, about 360 TPI, more preferably lower than, or equal to, about 300 TPI.

In preferred embodiments, said at least one belt layer has a thread count comprised between about 15 TPI and about 360 TPI, the extreme values being included, preferably between about 30 TPI and about 300 TPI, the extreme values being included, for example equal to about 60 TPI.

Preferably, the reinforcing cord(s) of said at least one belt layer has/have a diameter lower than, or equal to, about 0.55 mm, more preferably lower than, or equal to, about 0.35 mm.

Preferably, the reinforcing cord(s) of said at least one belt layer has/have a diameter greater than, or equal to, about 0.10 mm, more preferably greater than, or equal to, about 0.12 mm.

In preferred embodiments, the reinforcing cord(s) of said at least one belt layer has/have a diameter comprised between about 0.10 mm and about 0.55 mm, the extreme values being included, preferably between about 0.12 mm and about 0.35 mm, the extreme values being included, for example equal to about 0.30 mm.

It is preferable that the reinforcing cord(s) of said at least one belt layer have a diameter substantially identical to that of the reinforcing cords used in the carcass structure.

Preferably, the reinforcing cord(s) of said at least one belt layer has/have a linear density greater than, or equal to, about 110 dtex, more preferably greater than, or equal to, about 230 dtex.

Preferably, the reinforcing cord(s) of said at least one belt layer has/have a linear density lower than, or equal to, about 1300 dtex, more preferably lower than, or equal to, about 940 dtex.

In preferred embodiments, the reinforcing cord(s) of said at least one belt layer has/have a linear density comprised between about 110 dtex and about 1300 dtex, the extreme values being included, preferably between about 230 dtex and about 940 dtex, the extreme values being included, for example equal to about 450 dtex.

Said at least one carcass ply can comprise opposite end edges joined end-to-end at the crown portion of the tread band (or of said at least one belt layer, if provided), or at least partially overlapping one another at the crown portion of the tread band (or of said at least one belt layer, if provided), or be axially spaced apart from one another. In this last case, the end edges can be positioned below the crown portion of the tread band (or of said at least one belt layer, if provided) or be in different axial positions from that of the crown portion of the tread band (or of said at least one belt layer, if provided). In the case of a two-ply tyre, both the carcass plies can have the respective opposite end edges with identical mutual arrangement, or one of the carcass plies can have a mutual arrangement of the end edges thereof different from that of the other carcass ply. In this last case, a preferred configuration is the one in which the end edges of the radially innermost carcass ply are axially spaced apart from one another and in axial positions different from that of the crown portion of the tread band (or of said at least one belt layer, if provided), whereas the end edges of the radially outermost carcass ply are joined end-to-end at the crown portion of the tread band (or of said at least one belt layer, if provided).

DESCRIPTION OF THE FIGURES AND OF PREFERRED EMBODIMENTS

Further characteristics and advantages of the tyre of the present invention will become clearer from the following detailed description of some preferred embodiments thereof, made with reference to the attached drawings. In such drawings.

Figure 1:
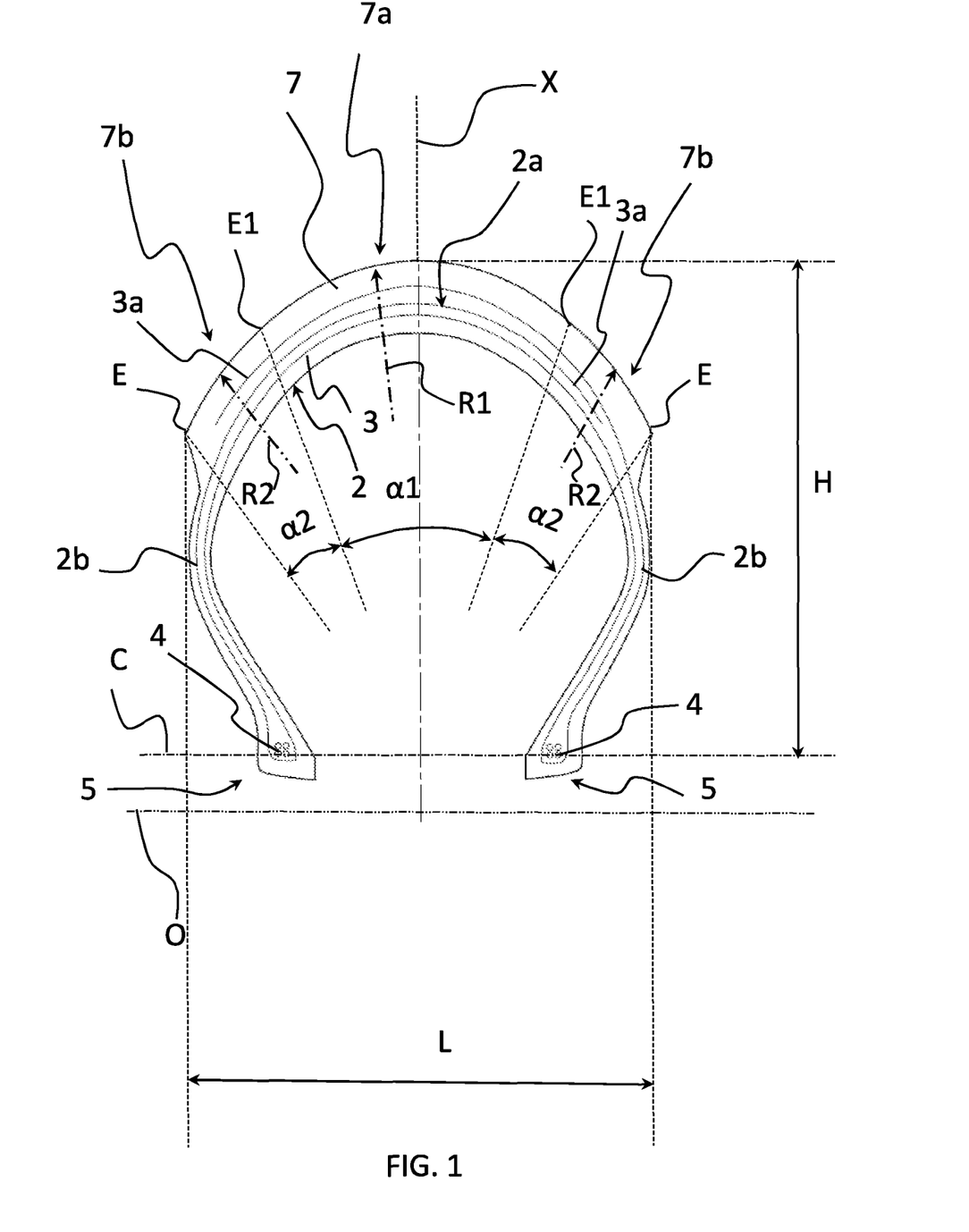
FIG. 1 schematically shows a radial section of an embodiment of the tyre in accordance with the present invention.

In FIG. 1, reference numeral 100 wholly indicates a bicycle tyre according to the present invention. The tyre is intended to be mounted on the wheels of a bicycle, in particular on the wheels of an electric road bicycle.

The tyre 100, once mounted on the wheel of the bicycle, is preferably inflated to a pressure comprised between about 1.5 bar and about 3.5 bar, for example equal to 2.3 bar.

The tyre 100 comprises a rotation axis O and an equatorial plane X orthogonal to the rotation axis O. A circumferential direction extending along the direction of rotation of the tyre 100 and an axial direction perpendicular to the equatorial plane X and/or parallel to the rotation axis O are also defined.

The tyre 100 of FIG. 1 comprises a carcass structure 2 comprising a crown portion 2a, which is preferably symmetrically arranged with respect to the equatorial plane X, and opposite lateral portions 2b arranged on axially opposite sides with respect to the crown portion 2a.

Figure 6:
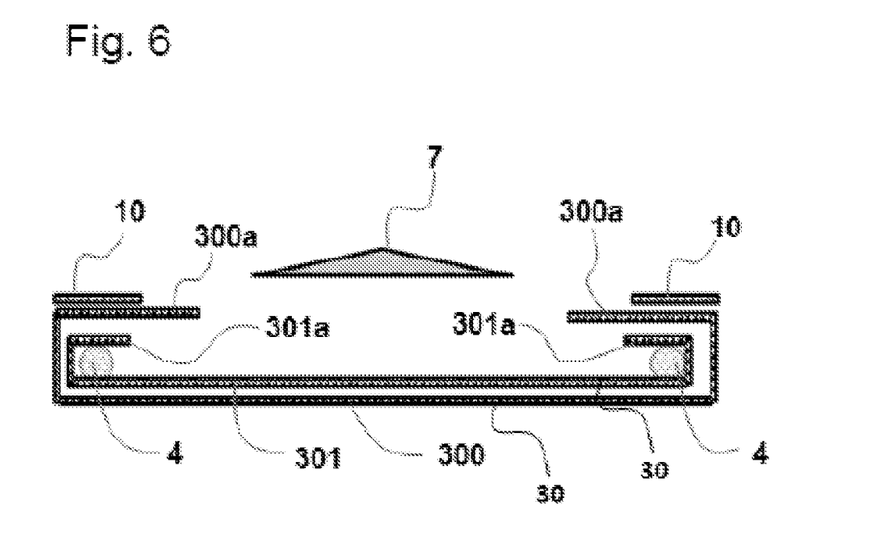
Figure 7:
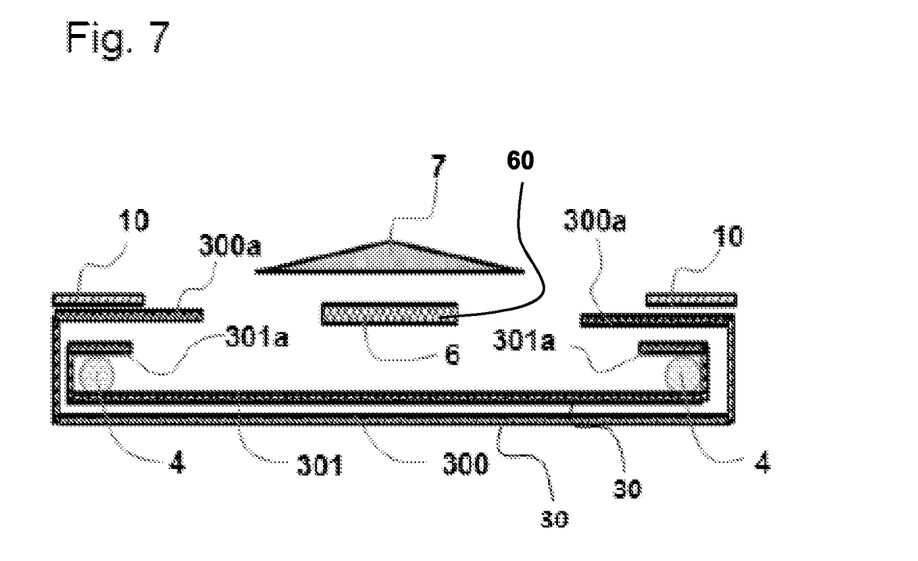

In the embodiment shown in FIG. 1, the carcass structure 2 comprises a single carcass ply 3 (single-ply tyre), but other embodiments (like for example those schematized in FIGS. 6 and 7) in which the carcass structure 2 comprises a plurality of carcass plies, preferably two, indicated with 300, 301 in FIGS. 6 and 7 (two-ply tyre) are also provided.

What is described below with reference to the carcass ply illustrated in the drawings applies both to the single carcass ply 3 of the single-ply tyre and to each carcass ply 300, 301 of the two-ply tyre or to each carcass ply of a tyre having more than two plies, except if explicitly stated otherwise.

The carcass ply 3 extends axially from one lateral portion 2b to the opposite lateral portion 2b.

The carcass ply 3 is engaged, at the respective axially opposite end edges 3a thereof, with respective annular anchoring structures 4, typically called "bead cores".

Each end edge 3a of the carcass ply 3 is turned around a respective bead core 4.

In an alternative embodiment, not illustrated, the carcass ply has the axially opposite end edges thereof associated with no turning with the annular anchoring structures, which are provided with two annular inserts. A filler made of elastomeric material can be arranged in an axially outer position with respect to the first annular insert. The second annular insert, on the other hand, is arranged in an axially outer position with respect to the end of the carcass layer. Finally, in an axially outer position with respect to said second annular insert, and not necessarily in contact with it, a further filler that ends the embodiment of the annular anchoring structure can be provided.

The bead cores 4 are preferably made of textile fibers having a high elastic modulus, like for example aramid fibers (common name of aromatic polyamide fibers), or of metallic wires, like for example steel.

On the outer perimeter edge of the bead cores 4 a tapered elastomeric filler that occupies the space defined between the carcass ply 3 and the respective turned end edge 3 can be applied.

The area of the tyre 100 comprising the bead core 4 and the possible elastomeric filler forms the so-called "bead", globally indicated in FIG. 1 with 5, intended for anchoring the tyre 100 on a corresponding mounting rim, not illustrated, through elastically forced fitting.

As for example shown in FIGS. 2-7, on the turned end edge 3a of the carcass ply 3 it is possible to apply, at each bead core 4, a band-like reinforcing element 10. Such a band-like reinforcing element 10 is arranged between the carcass ply 3 and the rim of the wheel when the tyre 100 is mounted on such a rim.

In place of the reinforced band-like reinforcing element 10 it is possible to use a single reinforcing cord deposited possibly after an adhesive treatment.

With reference to the tyre of FIG. 1, each of the two end edges 3a of the carcass ply 3 extends overlapping to cover the crown portion 2a of the carcass structure 2 so as to form, with a first radially inner carcass layer, three carcass layers in the crown portion 2a of the carcass structure 2.

With reference to FIGS. 2-7, a belt layer 6 that can possibly be provided in the tyre 100 is shown.

The belt layer 6 is associated with the carcass structure 2 at the crown portion 2a.

In a radially outer position with respect to the carcass structure 2 and, if provided, with respect to the belt layer 6, there is a tread band 7, by means of which the contact of the tyre 100 with the road surface takes place.

Figure 1A:
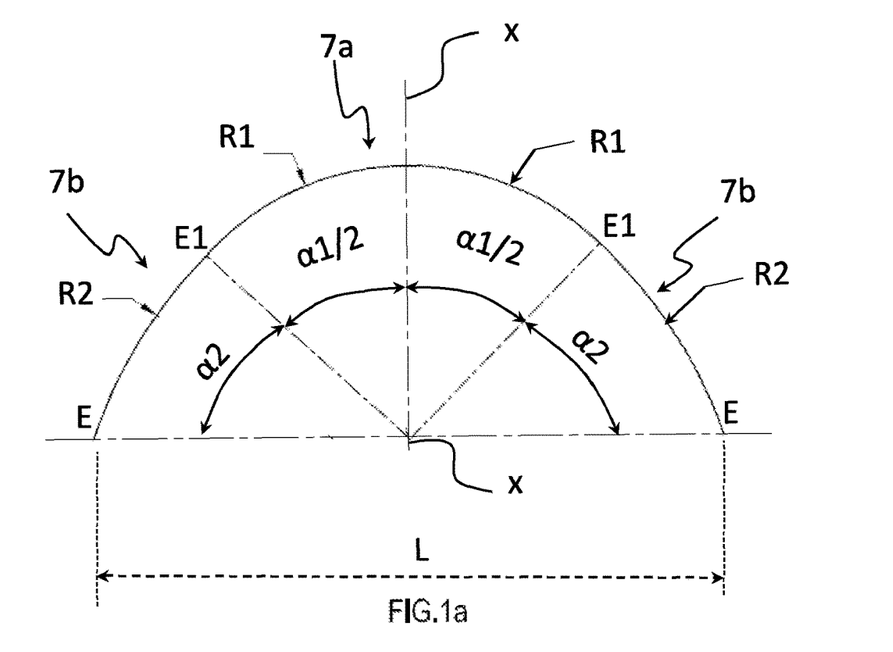
FIG. 1a schematically shows the curvature of the profile of the tread band of the tyre of FIG. 1.
Figure 1B:
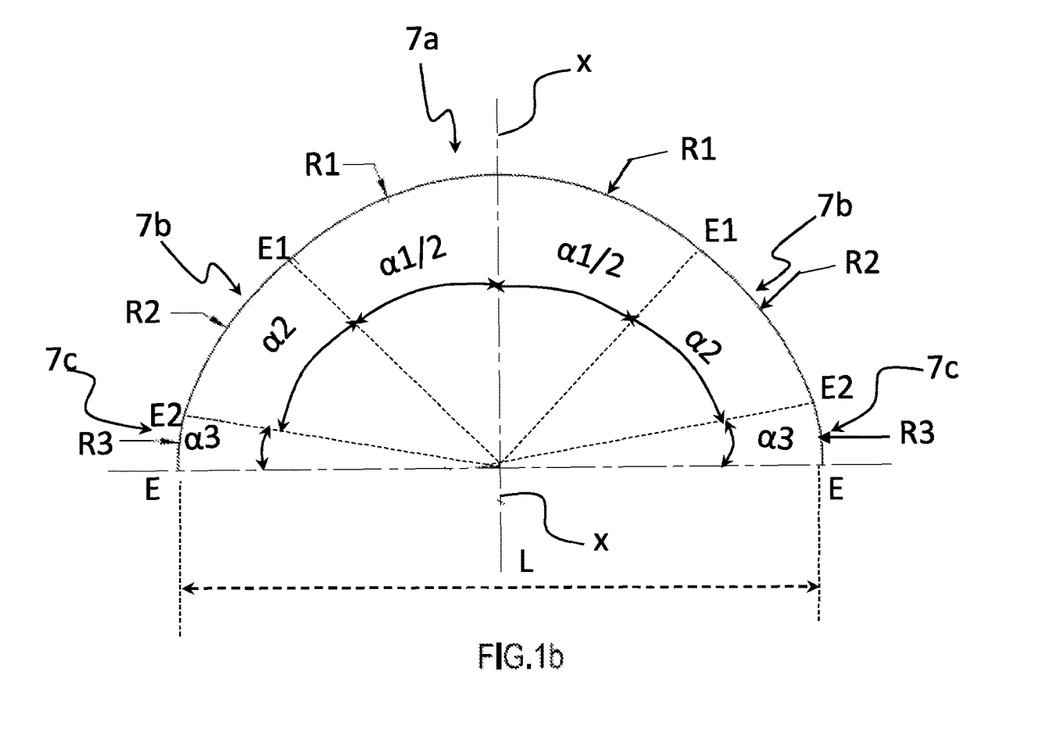
FIG. 1b schematically shows the curvature of the profile of the tread band of an alternative embodiment of the tyre of the present invention.

The tyre 100 has a width L (or maximum cord), which in the example described and shown herein corresponds to the distance between the two laterally opposite ends of the tread band 7 indicated with E in FIGS. 1, 1a, and 1b, preferably comprised between about 30 mm and about 70 mm, more preferably between about 35 mm and about 70 mm, for example equal to about 58 mm.

The carcass ply 3 of the tyre 100 is preferably made of elastomeric material and comprises a plurality of reinforcing cords 30 arranged substantially parallel to one another. In FIGS. 2-7 reference numeral 30 is associated with the whole of the reinforcing cords.

The reinforcing cords 30 are preferably made of a textile material selected among Nylon, Rayon, PET, PEN, Lyocell, Aramid, or combinations thereof, in one or more ends, preferably 1 or 2 ends.

The reinforcing cords 30 have a diameter preferably comprised between about 0.10 mm and about 0.55 mm, more preferably between about 0.12 mm and about 0.35 mm, the extreme values being included, for example equal to about 0.13 mm.

The reinforcing cords 30 have a linear density comprised between about 110 dtex and about 1300 dtex, more preferably between about 230 dtex and about 940 dtex, the extreme values being included, for example equal to about 450 dtex.

Specific examples of textile materials which can be used for the aforementioned reinforcing cords 30 are:

Nylon 930 dtex/1
Nylon 470 dtex/1
Nylon 230 dtex/1
Aramid 470/1 where the number 1 after dtex indicates the number of ends.

The reinforcing cords 30 can, however, be made of steel. In this case they have a diameter preferably comprised between 0.10 mm and 0.175 mm, the extreme values being included.

The reinforcing cords 30 are inclined, with respect to the equatorial plane of the tyre 100, by an angle comprised between about 30° and about 60°, preferably between about 40° and about 50°, the extreme values being included.

Preferably, in the case of a single-ply tyre, the aforementioned angle is about 45°. In this case the end edges 3a can have, in the crown portion 2a of the carcass structure 2, mutually parallel inclinations and counter-inclinations close to the equatorial plane X with respect to the inclination of the reinforcing cords 30 of the radially innermost carcass layer 3.

On the other hand, in the case of a two-ply tyre, like for example the one schematized in FIGS. 6 and 7, a first carcass ply 300 includes a plurality of reinforcing cords 30a inclined, with respect to the equatorial plane X of the tyre 100, by an angle preferably comprised between about 30° and about 60°, the extreme values being included, and a second carcass ply 301, arranged in a radially outer position with respect to the first carcass ply 300, includes a second plurality of reinforcing cords 30b inclined by the same angle, with respect to said equatorial plane X, on the opposite side with respect to the reinforcing cords 30a of the first carcass ply 300. In this last case the reinforcing cords 30a, 30b lie on respective inclined planes with respect to the rotation axis O, thus defining a crossed carcass structure.

Preferably, in the case of a single-ply tyre, the carcass ply 3 preferably has a thread count comprised between about 15 TPI and about 360 TPI, more preferably between about 30 TPI and about 300 TPI, even more preferably between about 60 TPI and about 240 TPI, even more preferably between about 120 TPI and about 200 TPI, the extreme values being included, for example equal to about 60 TPI.

Preferably, in the case of a two-ply tyre, like for example the one schematized in FIGS. 6 and 7, each carcass ply 300, 301 has a thread count comprised between about 15 TPI and about 200 TPI, more preferably between about 30 TPI and about 180 TPI, the extreme values being included, for example equal to about 60 TPI.

The tyre 100 shown in FIG. 1 does not comprise belt layers arranged in a radially outer position with respect to the carcass structure. However, different embodiments can be provided comprising a belt layer 6, like in the structures shown in FIGS. 2-7, or comprising more than one belt layer.

The belt layer 6, if provided, extends axially on the crown portion 2a of the carcass structure 2 for a segment having a predetermined width.

Preferably, such a width is lower than the width L of the tyre 100. More preferably, in the tyre 100 of FIG. 1 such a width is comprised between 20% and 80% of the width L of the tyre 100, even more preferably between 30% and 70% of the width L of the tyre 100, even more preferably between 40% and 65% of the width L of the tyre 100, the extreme values being included, for example equal to about 60% of the width L of the tyre 100.

Preferably, the width of the belt layer 6 is lower than 60 mm.

As an example, in a tyre 100 having width L comprised between 35 and 70 mm, the width of the belt layer 6 is equal to at least 20 mm.

Preferably, the belt layer comprises at least one reinforcing cord 60 wound on the carcass structure 2 according to a winding direction oriented, with respect to the equatorial plane X, at an angle comprised between about 0° and about 30°, the extreme values being included.

In a first embodiment, the reinforcing cord 60 is wound in a helix on the carcass structure 2 according to the aforementioned winding direction.

In an alternative embodiment, the belt layer 6 comprises a plurality of parallel reinforcing cords 60 each of which is wound on the carcass structure 2 according to the aforementioned winding direction.

Preferably, the aforementioned winding direction is substantially circumferential.

Preferably, the belt layer 6 has a thread count comprised between about 15 TPI and about 360 TPI, more preferably between about 30 TPI and about 300 TPI, for example equal to about 60 TPI.

Preferably, the reinforcing cord(s) 60 is/are made of a textile material, in particular the same textile material which the reinforcing cords 30 of the carcass layer 3 are made with.

Preferably, the reinforcing cord(s) 60 has/have a diameter comprised between about 0.10 mm and about 0.55 mm, the extreme values being included, preferably between about 0.12 mm and about 0.35 mm, the extreme values being included, for example equal to about 0.30 mm.

Preferably, the reinforcing cord(s) 60 has/have a linear density comprised between about 110 dtex and about 1300 dtex, preferably between about 230 dtex and about 940 dtex, for example equal to about 450 dtex.

The tread band 7 is made with a vulcanizable elastomeric composition comprising a reinforcing system consisting of modified fibers of silicates having nanometric dimensions and fibrillated polymeric fibers having micrometric dimensions as described above.

The belt layer 6, if provided, is made of an elastomeric compound that can be reinforced with the reinforcing system as described for the tread band or with typical reinforcing fillers like carbon black and/or silicates, known by a person skilled in the art.

As shown in FIG. 1, the tread band 7 comprises a crown portion 7a extending astride of the equatorial plane X and two lateral portions 7b arranged on axially opposite sides with respect to the crown portion 7a.

The profile of the tread band 7 is schematically shown in FIG. 1a.

With reference to such a figure, the crown portion 7a has a radius of curvature R1 smaller than the radius of curvature R2 of each of the lateral portions 7b and an angular width α1 greater than the angular width α2 of each of the lateral portions 7b.

The radius of curvature R1 is preferably comprised between about 20 mm and about 35 mm, more preferably between about 25 mm and about 30 mm, the extreme values being included. For example, the radius of curvature R1 is equal to about 27 mm.

The radius of curvature R2 is preferably comprised between about 30 mm and about 100 mm, more preferably between about 35 mm and about 70 mm, the extreme values being included. For example, the radius of curvature R2 is equal to about 40 mm.

The angular width α1 is preferably comprised between about 70° and about 90°, more preferably, between about 75° and about 85°, the extreme values being included. For example, the angular width α1 is equal to about 80°.

The angular width α2 is preferably comprised between about 35° and about 50°, more preferably between about 40° and about 45°, the extreme values being included. For example, the angular width α2 is equal to about 43°.

Preferably, the crown portion 7a extends axially for a segment having a width comprised between about 30% and about 80% of the width L of the tyre, more preferably between about 40% and about 70% of the width L of the tyre, even more preferably between about 45% and about 60% of the width L of the tyre, the extreme values being included, for example it is equal to about 50% of the width L of the tyre.

Preferably, each of the aforementioned lateral portions 7b extends axially for a segment having a width comprised between about 10% and about 35% of the width L of the tyre, more preferably between about 15% and about 30% of the width L of the tyre, even more preferably between about 20% and about 25% of the width L of the tyre, the extreme values being included, for example equal to about 25% of the width L of the tyre.

FIG. 1b shows the curvature of the profile of the tread band of an alternative embodiment of the tyre of the present invention.

With reference to such a figure, the tyre 100 comprises, in an axially outermost position with respect to each of the aforementioned lateral portions 7b, a respective shoulder portion 7c preferably having a radius of curvature R3 smaller than the radius of curvature R2 and a angular width α3 smaller than the angular width α2.

Preferably, the radius of curvature R3 is comprised between about 25 mm and about 50 mm, more preferably between about 30 mm and about 40 mm, the extreme values being included. For example, the radius of curvature R3 is equal to about 35 mm.

The angular width α3 is preferably comprised between about 0° and about 25°, more preferably between about 10° and about 20°, the extreme values being included. For example, the angular width α3 is equal to about 15°.

Preferably, each of the aforementioned shoulder portions 7c extends axially for a segment having a width comprised between about 0% and about 15% of the width L of the tyre, more preferably between about 5% and about 10% of the width L of the tyre, the extreme values being included, for example equal to about 6% of the width L of the tyre.

Preferably, the tyre 100 of FIGS. 1 and 1a has a ratio R1/L equal to at least 0.3 and a ratio between R2/L comprised between about 0.5 and about 3, more preferably between about 0.55 and about 2, even more preferably between about 0.6 and about 1.5, the extreme values being included, for example equal to about 0.7.

The tyre 100 of FIG. 1b has the same ratios R1/L and R2/L discussed above, whereas the ratio R3/L is preferably comprised between about 0.3 and about 0.6, more preferably between about 0.45 and about 0.55, the extreme values being included, for example equal to about 0.5.

Radii of curvature R1, R2 (FIGS. 1a and 1b) and R3 (FIG. 1b) can be determined as described below, based on FIGS. 1a and 1b.

The tyre 100 is mounted on the ETRTO reference rim for the measurement of the tyre and it is inflated to nominal pressure (for example to 2.3 bar). Then the outer profile of the tread band 7, disregarding possible recesses, is brought on paper to 1:1 scale so that it can be measured. The profile is divided into two symmetrical halves (half-profiles) with respect to an axis x-x (which represents the line of the equatorial plane) and it is then interpolated with a sequence of arcs. The number of arcs and the optimal sequence are those that make it possible to minimize the divergence with respect to the real profile, obtaining an interpolated profile.

FIG. 1a gives an example of an interpolation that, in each half-profile, provides two arcs that join in points E1 of the profile.

FIG. 1b gives an example of an interpolation that, in each half-profile, provides three arcs that join in points E1, E2 of the profile.

The radius of curvature of the crown portion 7a (FIGS. 1a and 1b), of each of the lateral portions 7b (FIGS. 1a and 1b) and of each of the shoulder portions 7c (FIG. 1b) is obtained as the radius of the axially outermost arc (or average of the radii of the arcs) subtended in the sectors having an angular width respectively equal to α1, α2 and α3.

In all of the embodiments described above the tyre 100 has an outer diameter (which, according to Anglo-Saxon convention, is expressed in inches) preferably comprised between about 24 inches and about 30 inches, more preferably comprised between about 26 inches and about 29 inches, the extreme values being included, for example equal to about 27.5. inches.

The fitting diameter according to ISO or E.T.R.T.O. convention is preferably comprised between about 500 mm (which corresponds to an outer diameter of about 24 inches) and about 650 mm (which corresponds to a particular outer diameter of about 28, 29 or 30 inches depending on the width of the tyre).

The tyre 100 has a section height H, measured on the equatorial plane X between the top of the tread band 7 and the fitting diameter, defined in FIG. 1 by the reference line C passing through the beads 5 of the tyre.

Preferably, the height H is comprised between about 30 mm and about 90 mm, more preferably between about 40 mm and about 80 mm. for example the height H can be equal to about 60 mm.

The weight of the tyre 100 is comprised between about 0.25 Kg and about 1.4 Kg, preferably between about 0.5 Kg and about 1.2 Kg, more preferably between about 0.6 Kg and about 1 Kg, for example equal to about 0.9 Kg.

Preferably, the building of the tyre 100 takes place according to processes known by a person skilled in the art.

FIGS. 2-7 illustrate different constructive schemes of tyres in accordance with the present invention.

Figure 2:
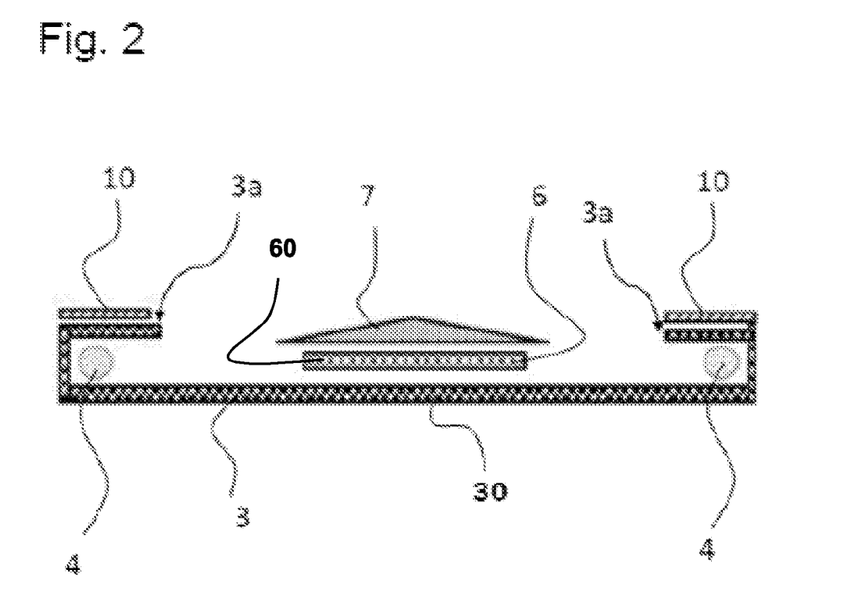
FIGS. 2-7 show possible schematic constructive schemes representative of alternative embodiments of the tyre of the invention.

In the constructive scheme of FIG. 2 the end edges 3a of the carcass ply 3 of the tyre (which in this case is a single-ply tyre) are axially spaced apart from one another and are in axial positions different from that of the belt layer 6, which however may not be present. In the specific example of FIG. 2, the band-like reinforcing element 10, which however may not be present, is applied on the turned end edge 3a of the carcass ply 3.

Figure 3:
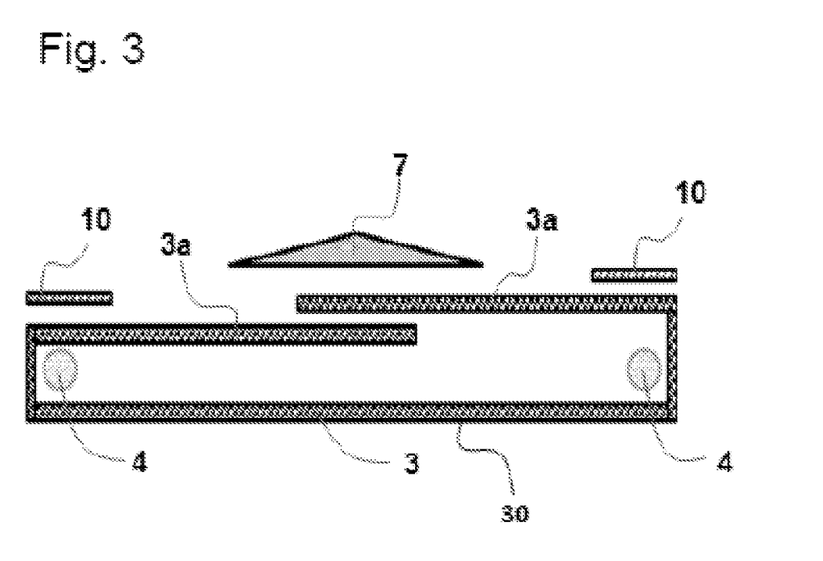
Figure 4:
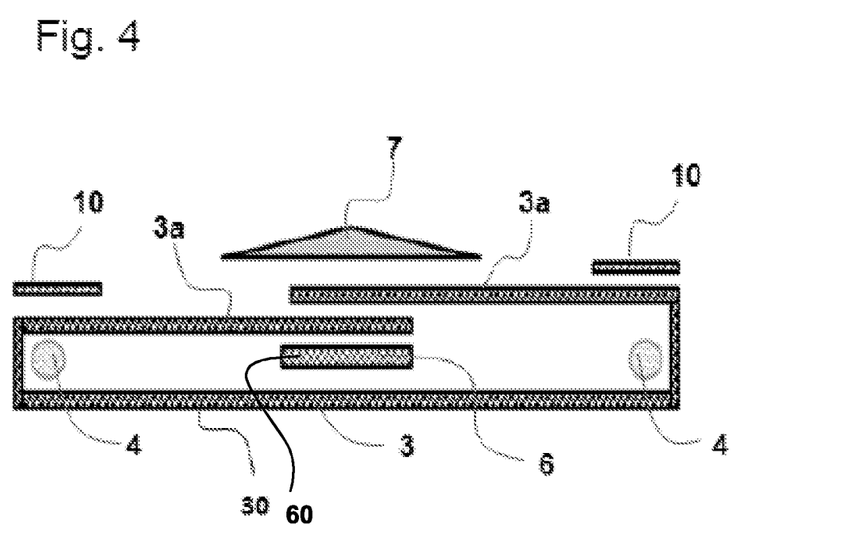
Figure 5:
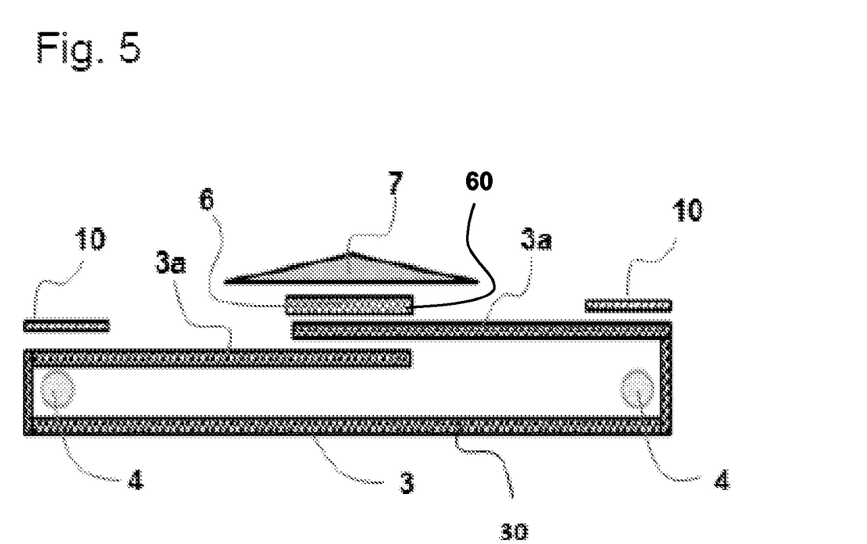

FIGS. 3-5 schematically show possible further embodiments of a single-ply tyre in accordance with the present invention.

Such embodiments differ from that of FIG. 2 in that the end edges 3a partially overlap to each other at the tread band 7, and in that they do or do not comprise the belt layer 6.

In the embodiments of FIGS. 2-5, the reinforced band-shaped element 10 is applied close to the beads 5, on the turned end edge 3a of the carcass ply 3. However, the reinforced band-shaped element 10 may not be present.

FIGS. 6 and 7 schematically show possible embodiments of a two-ply tyre in accordance with the present invention.

In the embodiment of FIGS. 6 and 7, both the carcass plies 300, 301 have the respective opposite end edges 300a, 301a that are turned around the bead cores 4, which are axially spaced apart from one another and in different axial positions from that of the tread band 7.

The embodiments of FIGS. 6 and 7 differ from each other in that they do or do not comprise the belt layer 6.

The present invention has been described with reference to some preferred embodiments. Different modifications can be brought to the embodiments described above, whilst still remaining within the scope of protection of the invention, defined by the following claims.

In an alternative embodiment (not shown) the tyre can comprise a carcass structure 2 of the radial type with reinforcing elements arranged inclined with respect to the equatorial plane, close to the equatorial plane itself, by an angle greater than 65°, preferably comprised between 70° and 90°, said tyre being provided with a belt layer or belt structure which is radially outer with respect to the carcass structure, said belt layer being so-called zero degrees layer and comprising reinforcing elements having substantially circumferential orientation, i.e. arranged with an inclination lower than 30°, preferably lower than 20°, with respect to the circumferential direction perpendicular to the rolling axis of the tyre.

In such a construction the belt layer is formed by winding in a helix, on the crown portion 2a of the carcass structure 2, in the axial direction and with preferably constant winding pitch a single reinforcing cord according to a winding direction oriented, with respect to the equatorial plane X, at an angle comprised between about 0° and about 30°, the extreme values being included.

The invention claimed is:

1. A bicycle wheel, comprising:
a rim and
a bicycle tyre comprising:
a carcass structure and a tread band applied in a radially outer position with respect to the carcass structure,
wherein the tread band comprises a crown portion extending astride of an equatorial plane of the tyre and having a first radius of curvature, and a pair of lateral portions arranged on axially opposite sides with respect to the crown portion and each having a second radius of curvature greater than the first radius of curvature, wherein the tread band further comprises a pair of shoulder portions arranged on axially opposite sides with respect to the crown portion and in an axially outermost position with respect to the lateral portions, wherein each of said shoulder portions has a third radius of curvature smaller than the second radius of curvature, and
wherein the tyre is mounted on the rim and is inflated to a pressure range greater than, or equal to, about 1.5 bar and lower than, or equal to, about 3.5 bar.

2. A bicycle tyre comprising:
a carcass structure and a tread band applied in a radially outer position with respect to the carcass structure,
wherein the tread band comprises a crown portion extending astride of an equatorial plane of the tyre and having a first radius of curvature, and a pair of lateral portions arranged on axially opposite sides with respect to the crown portion and each having a second radius of curvature greater than the first radius of curvature,
wherein the tread band further comprises a pair of shoulder portions arranged on axially opposite sides with respect to the crown portion and in an axially outermost position with respect to the lateral portions, and wherein each of the shoulder portions has a third radius of curvature smaller than the second radius of curvature.

3. The tyre according to claim 2, wherein the tyre has a predetermined maximum cross section width and wherein the ratio between the second radius of curvature and the maximum cross section width ranges from about 0.5 to about 3.

4. The tyre according to claim 2, wherein the first radius of curvature ranges from about 20 mm to about 35 mm.

5. The tyre according to claim 2, wherein the second radius of curvature ranges from about 30 mm to about 100 mm.

6. The tyre according to claim 2, wherein the crown portion has an angular width ranging from about 70° to about 90°.

7. The tyre according to claim 2, wherein each of the lateral portions has an angular width ranging from about 35° to about 45°.

8. The tyre according to claim 2, wherein the third radius of curvature ranges from about 25 mm to about 50 mm.

9. The tyre according to claim 2, wherein each of the shoulder portions has an angular width ranging from about 0° to about 20°.

10. The tyre according to claim 2, wherein the tyre weighs an amount ranging from about 0.25 Kg to about 1.4 Kg.

11. The tyre according to claim 2, wherein the carcass structure comprises at least one carcass ply engaged, at each of the axially opposite end edge thereof, to a respective annular anchoring structure, the carcass structure having a plurality of reinforcing cords inclined, with respect to the equatorial plane, by a first angle.

12. The tyre according to claim 11, wherein the first angle ranges from about 30° to about 60°.

13. The tyre according to claim 11, wherein the carcass structure comprises a first carcass ply having a first plurality of reinforcing cords inclined, with respect to the equatorial plane, by the first angle and a second carcass ply applied in a radially outer position with respect to the first carcass ply and having a second plurality of reinforcing cords inclined, with respect to the equatorial plane, by the first angle on the opposite side to the first plurality of reinforcing cords.

14. The tyre according to claim 2, wherein the third radius of curvature is different from the first radius of curvature.

15. The tyre according to claim 14, wherein the third radius of curvature is greater than, or equal to, the first radius of curvature.

* * * * *